(No Model.) 3 Sheets—Sheet 1.
E. H. EISENHART.
APPARATUS FOR MEASURING THE LENGTH OF FABRICS.
No. 327,540. Patented Oct. 6, 1885.
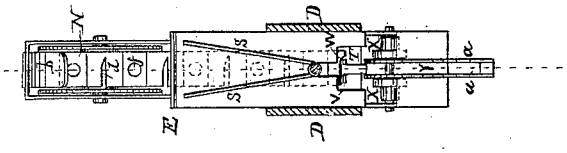
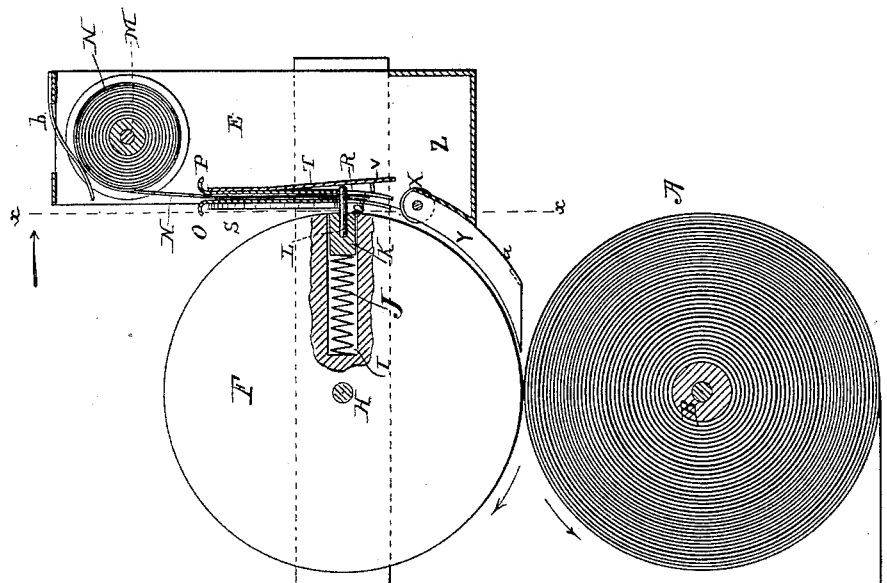
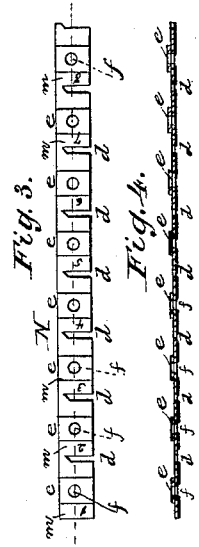
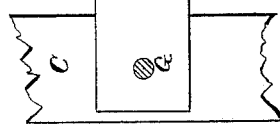
WITNESSES:
Herman Gustow
E. Wolff
INVENTOR
E. H. Eisenhart,
BY
Chas. C. Gill
ATTORNEY (No Model.) 3 Sheets—Sheet 2.
E. H. EISENHART.
APPARATUS FOR MEASURING THE LENGTH OF FABRICS.
No. 327,540. Patented Oct. 6, 1885.
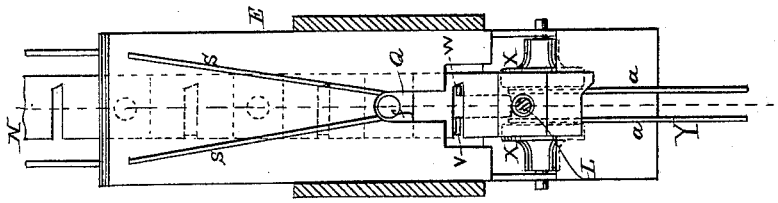
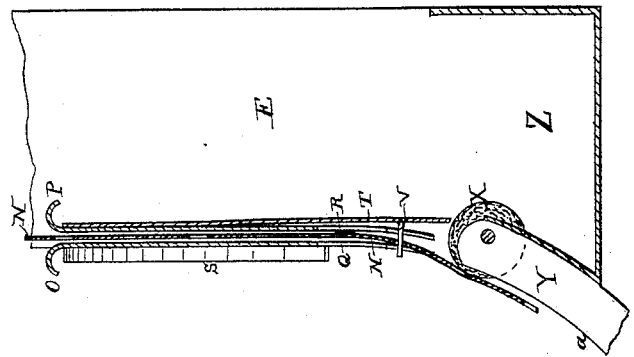
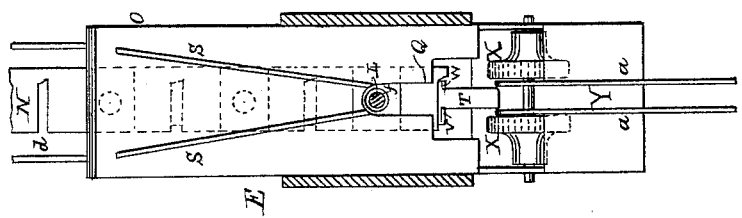
WITNESSES: INVENTOR
Herman Gustow E. H. Eisenhart,
E. Wolff BY
Chas. C. Gill
ATTORNEY (No Model.) 3 Sheets—Sheet 3.
E. H. EISENHART.
APPARATUS FOR MEASURING THE LENGTH OF FABRICS.
No. 327,540. Patented Oct. 6, 1885.
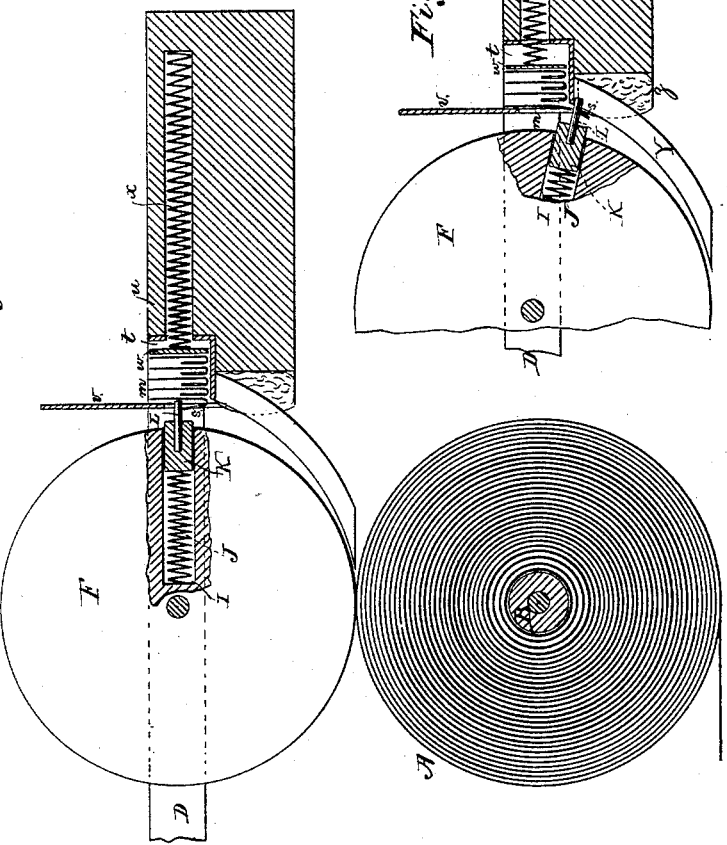
WITNESSES:
Herman Gustow
E. Wolff
INVENTOR
E. H. Eisenhart,
BY
Chas. O. Gill
ATTORNEY

UNITED STATES PATENT OFFICE.

EDWARD H. EISENHART, OF NEW YORK, N. Y.

APPARATUS FOR MEASURING THE LENGTH OF FABRICS.

SPECIFICATION forming part of Letters Patent No. 327,540, dated October 6, 1885.

Application filed September 4, 1884. Serial No. 142,238. (No model.)

*To all whom it may concern:*

Be it known that I, EDWARD H. EISENHART, a citizen of the United States, and a resident of New York, in the county of New York and State of New York, have invented a certain new and useful Process of and Apparatus for Measuring the Length of Fabrics, of which the following is a specification.

The invention relates to an improved apparatus for measuring the length of fabrics. The apparatus is adapted for use in connection with any of the well-known forms of winding-machines employed in winding carpets and similar goods as they leave the weaving-machine.

The main object of the invention is to measure the length of the carpet in yards or fractions thereof, as may be desired, as the same is wound into a roll, and to note the measurement by applying to the carpet at yard lengths, or less, tags bearing numerals consecutively, so that when the fabric is wound into a roll its length may be determined by merely looking at the last tag applied. The tags also serve to dispense with the labor of measuring off with the usual yard-stick pieces of fabric desired by purchasers and facilitate the taking of inventories of stock.

The invention will be understood more fully from the detailed description hereinafter presented, reference being had to the accompanying drawings, in which—

Figure 1 is a side elevation of an apparatus embodying the elements of the invention, the same being shown partly in section and in connection with a roll of carpet. Fig. 2 is a sectional view of the apparatus on the line $x\ x$ of Fig. 1, looking in the direction of the arrow. Fig. 3 is a view of the strip or tape used in the apparatus, and which, during the operation thereof, is severed into tags, which are attached at definite intervals to the carpet. Fig. 4 is a central longitudinal section of the tape or strip, taken on the dotted line shown in Fig. 3, the adhesive material on the under side of the strip or tape being denoted by a dotted line. Fig. 5 is an enlarged view of the lower part of the apparatus, taken on the line $x\ x$ of Fig. 1. Fig. 6 is an enlarged central vertical longitudinal section of same. Fig. 7 is a similar view to Fig. 5, with the exception that the tape or strip of tags in this instance is drawn forward in such position that one of the tags upon the further operation of the machine will be torn from the strip and carried to the roll of fabric. Fig. 8 is a side elevation, partly in section, of a modification of the invention. Fig. 9 is a front view of same, the roller F being removed. Fig. 10 is a detached sectional view of the modified form of apparatus, showing the pin L in a different position from that indicated in Fig. 8. Fig. 11 is a detached view of the tag to be applied to the fabric.

Referring to the drawings, A denotes the roll of carpet as it is wound upon the usual winding-machine now in use; B, the spindle on which it is wound.

Upon any suitable frame, C, connected with the winding-machine is loosely pivoted one end of the arm or arms D, said arms having at their opposite end the casing E, and in front of same the roller F. The arms D are adapted to have a hinged movement upon the pivot G, and the roller F is capable of rotation upon the pivot H, and rests centrally upon the roll of fabric A. The roller F, when measuring yard lengths, will be thirty-six inches in circumference, and when measuring half-yard lengths will be eighteen inches in circumference, the size of the roller varying at all times with the length of the measurements to be notated on the fabric.

Within the roll F will be formed the cavity I, in which is placed the spring J and follower K, the latter carrying a pin, L, which at the proper time may project beyond the line of the circumference of the roller, as indicated in Fig. 1. The follower K is employed to carry the pin L, and may have a free movement in the cavity I, the spring J serving to force the follower and pin toward the circumference of the roller. The purpose of the pin L will be fully explained hereinafter.

Between the upper portion of the two sides of the casing E is secured the spindle M, upon which is wound the tape or strip of tags N, the particular construction of the strip or tape being illustrated in Figs. 3 and 4, and will be hereinafter referred to. The free end of the strip or tape N passes downward between the plates O P, which serve as guides, and the lower ends of which are slotted, as shown, the slots being lettered, respectively, Q R.

Upon the front face of the plate O are secured the guides S, and upon the rear face of the plate P is secured, at its upper end, a flat spring, T, the lower end of the spring being adapted to be moved toward or from the lower end of the plate P, and being provided with the horizontal lips or projections V W, which are utilized during the operation of the machine for facilitating the severance of the tags from the strip or tape N. The lower end of the spring T terminates in close relation to the upper edge of the rollers X, which are mounted on either side of the guide Y, and have a felt or other porous surface in order that they may carry a sufficient amount of moisture to dampen the mucilage on the under side of the tags as they are torn from the strip N. The lower part of the casing E is formed into a box or receptacle, Z, for containing water, whereby the rolls X may be kept continually moist.

The guide Y consists of two parallel strips or pieces, $a$, and extends in the arc of a circle to a point contiguous to the lower central portion of the roller F.

In the upper end of the casing E is secured a spring, $b$, the free end of which bears upon the roll of tape N, and serves to prevent it from unwinding too freely or becoming loose upon the spindle M.

The strip or tape N is provided with slits $d$ at regular intervals, and is re-enforced or strengthened centrally between the slits $d$ by an additional layer of paper or other material, $e$, apertures $f$ being formed through the re-enforce $e$ and the tape. The purpose of the slits $d$ is to facilitate the severing of the tape into tags or pieces, and of the re-enforce $e$ to prevent the tape being mutilated or torn, except at the proper time, when the pin L moves into the apertures $f$.

Operation: The winding of the fabric A upon the shaft B is accomplished in the usual manner, and the friction of the revolving roll of fabric against the edge of the roller F serves to set the latter in motion. The end of the strip or tape N is drawn downward beneath the slot Q, as shown in Figs. 2 and 5, and when in this position the pin L, upon the revolution of the roller F, will enter the exposed aperture $f$ and draw the tape downward until the lugs V W enter the first slit $d$ becoming exposed and the extremity of the tape is upon the rollers X, as shown in Fig. 6, at which time the resistance offered by the lugs V W to the further downward passage of the tape causes the said extremity thereof upon the rollers X X to be detached and carried downward upon the guide Y until its dampened side comes in contact with the fabric A centrally below the roller F, when the pressure of the fabric will force the pin into the cavity I, freeing the tag, which then adheres, by means of its gummed surface, to the fabric, while upon the continued revolution of the roller F the pin L is again forced beyond the periphery of the roller and into position to enter the next aperture $f$ of the tape N and remove another tag, carrying it to the fabric, and there leaving it as before. During the revolution of the roller F the pin L slides down the face of the casing E between the guides S, and when it reaches the slot Q it will enter the aperture $f$ in the tape N and force the spring T inward until the lugs V W pass beyond the lower edge of the tape, and after the roller F has revolved a sufficient distance to cause the pin L to pass from off the spring T the said spring will return to its normal position and the lugs V W will enter the succeeding slit $d$, now in position to receive them, and hold the tape, while the pin L continues its downward movement in the guide Y, carrying the detached extremity of the tape and depositing it upon the fabric, as described above. When the pin L forces the spring T inward, the latter forms no obstruction to the free passage of the tape; but when the pin passes off of the said spring and allows the lugs V W to enter the slit $d$ the tape will be held so that the force exerted by the revolution of the roller F will detach the end thereof, as aforesaid. The pin L is forced inward against the spring T by the coiled spring J.

It will be seen by reference to Figs. 6 and 7 that the end of the tape will be invariably moved over the surface of the rollers X, whereby the mucilage on the rear side of the tape is moistened for the purpose of enabling the tag to adhere to the fabric.

It will be understood that when the roller F is thirty-six inches in circumference it will make one revolution with every yard of cloth that is wound upon the shaft B, and, upon that revolution it will detach one tag from the tape N, and deposit it upon the fabric A. The tags being numbered consecutively, the number of yards in the roll A will be indicated by the last tag applied thereto. The roller F is a very important element of the apparatus, since it not only measures the fabric but deposits the tag thereon, so that the measurement may not be lost. When one strip or roll of the tape N has become consumed, the pin M may be withdrawn and another roll of the tape added without inconvenience. When the tag is detached, and is carried downward upon the guide Y, the pin L moves between the two sides $a\ a$ of same.

I do not limit the invention to the use of a continuous strip, N, since the tags lettered $m$ may be in separate pieces and inclosed in a suitable casing in proper relation to the roller F to permit one of the tags being removed at each revolution thereof and delivered upon the fabric.

The modification illustrated in Figs. 8 to 11, inclusive, does not differ in principle from the invention shown in Fig. 1, and varies from it only in the fact that in the modification detached tags m are employed instead of a tape, N. The roller F, with its pin L and the guide Y, illustrated in Fig. 8 are precisely the same as shown in Fig. 1. In Fig. 8 t indicates a box or receptacle formed in a block, u, containing the series of tags m, which are kept against the plate v by means of the follower w and spring x. I employ a long spring, x, in order to give the tags a continuous gentle pressure sufficient to hold them in position without danger of their being torn by the pin L. In the face of the plate v is formed a slot, y, which exposes the front face of the tag adjacent to the plate. In the block u, on each side of the guide y, is provided a sponge or other porous material, z, for the purpose of moistening the backs of the tags m as they are carried downward on the guide Y by the pin L. The tags m will bear consecutive numbers, and will have at their lower edge a lip, s, and aperture f, and when the tags are arranged against each other in the receptacle t the lips will be turned upward, as shown, in order that when the roller F is revolved the pin L may slide down the face of the plate v, and passing against the upper end of the said lip s turn the same downward and enter the aperture f, and draw the tag with it downward over the sponge z and guide Y, depositing it upon the fabric.

In Fig. 8 I show the position of the pin L when it first passes into the slot y, and in Fig. 10 the position of the tag is illustrated after the pin L has passed into the aperture f and is about to draw the tag m from the receptacle.

It is to be noted that the tags m are applied directly upon the fabric and carry the numbers indicating the yard-measurements, but that the fabric is not injured thereby, since the tag may be readily removed when desired. It is plain, therefore, that the invention may be applied to goods of all kinds, which would not be the case if the numbers were printed upon the fabric or otherwise applied so that they could not be removed.

I have described the invention as used in connection with a roll of carpet, but I do not confine my invention to such use, since it is equally applicable to fabrics of all kinds, including cotton and woolen goods, paper, &c.

What I claim as my invention, and desire to secure by Letters Patent, is—

1. In combination with a winding-reel, the roller F of predetermined dimensions, the roll carrying tape bearing consecutive numbers or indicating-marks, and means, substantially as described, for carrying a section of the tape to the material operated on, substantially as and for the purposes described.

2. In combination with a winding-reel for fabrics, the roller F of predetermined dimensions, a roller carrying tape having an adhesive agent on its back and consecutive indicating-marks on its face, damping-rolls in the path of the back of said tape, and means, substantially as described, for carrying a section of the tape to the material operated on, substantially as and for the purposes described.

3. In combination with a winding-reel for fabrics, the roller F of predetermined dimensions, the movable pin L, carried by said roller, the roller carrying tape bearing consecutive numbers or indicating-marks, and a plate, P, against which the tape travels, said plate having an opening or slot, Q, substantially as and for the purposes set forth.

4. In an apparatus for measuring fabrics, the roller F, carrying the movable pin L, in combination with the tape N, bearing consecutive numbers or indicating-marks, the slotted plate P, and spring T, substantially as set forth.

5. In an apparatus for measuring fabrics, the roller F and pin L, in combination with the tape bearing indicating-marks, the plates O P, between which the tape travels, the plate T, and the guide Y, substantially as set forth.

6. In a machine for measuring fabrics, the roller F and pin L, combined with the tape N, having an adhesive agent on its back and a face bearing indicating-marks, guides for the tape, and damping-rolls X, against which the tape may move, substantiallly as set forth.

7. In a device for measuring fabrics, the roller F, carrying the movable pin L, in combination with the tape N, having apertures f and slits d, substantially as set forth.

8. The roller F, carrying the pin L, in combination with the series of tags bearing consecutive indicating-marks, and the rollers X, the tags having an adhesive agent on one side and arranged to move against the dampened rollers X, substantially as set forth.

9. The casing E, containing the tape N, having slits d and apertures f, the guides O P, guides S, spring T, having lugs V W, the rollers X, and guide Y, in combination with the roller F, carrying the pin L, substantially as set forth.

Signed at New York, in the county of New York and State of New York, this 23d of August, A. D. 1884,

EDWARD H. EISENHART.

Witnesses:
CHAS. C. GILL,
HERMAN GUSTOW.